United States Patent [19]
Dore et al.

[11] 3,854,934
[45] Dec. 17, 1974

[54] PURIFICATION OF MOLTEN ALUMINUM AND ALLOYS

[75] Inventors: James E. Dore, Milford; Peter E. Sevier, Woodbridge; John C. Yarwood, Madison, all of Conn.

[73] Assignee: Swiss Aluminium Ltd., Chippis, Switzerland

[22] Filed: June 18, 1973

[21] Appl. No.: 371,127

[52] U.S. Cl. ............... 75/68 R, 75/93 R, 75/93 AC
[51] Int. Cl. ............................................. C22b 21/06
[58] Field of Search ............. 75/68 R, 93 R, 93 AC

[56] References Cited
UNITED STATES PATENTS

| | | | |
|---|---|---|---|
| 1,998,467 | 4/1935 | Stroup | 75/68 R |
| 3,650,730 | 3/1972 | Derham | 75/93 AC |
| 3,737,305 | 6/1973 | Blayden et al. | 75/68 R |

FOREIGN PATENTS OR APPLICATIONS

| | | | |
|---|---|---|---|
| 712,900 | 8/1954 | Great Britain | 75/68 R |

Primary Examiner—L. Dewayne Rutledge
Assistant Examiner—M. J. Andrews
Attorney, Agent, or Firm—Robert H. Bachman

[57] ABSTRACT

A process for the removal of gaseous and solid impurities, such as occluded hydrogen and metallic oxides, from molten aluminum and aluminum alloys without excessive discharge of potentially harmful gases and fumes into the atmosphere, is carried out by passing a stream of purifying gas through the molten metal while the latter is maintained in contact with a liquefied salt cover, lower in density than the molten metal, the gas containing a small proportion of a fully fluorinated or chlorofluorinated lower hydrocarbon mixed with a relatively inactive or inert gas such as nitrogen, helium or argon.

22 Claims, No Drawings

PURIFICATION OF MOLTEN ALUMINUM AND ALLOYS

BACKGROUND OF THE INVENTION

This invention relates to a novel improved process for effecting the purification of molten aluminum or aluminum alloys by the removal of gaseous impurities, such as hydrogen as well as of solid impurities, such as metal oxides and other compounds, from the molten metal, which process is characterized by the use of non-toxic material and by the practical elimination of substantial reduction in the discharge of potentially harmful gases and fumes into the atmosphere, which can readily be carried out in existing metal melting and casting installations, and which can be utilized economically.

The prior processes which have been used or proposed for the purification of molten aluminum or its alloys have been characterized by important defects and disadvantageous features which have heretofore remained unsolved. Thus, the widely used purification of molten metal with chlorine gas has been unavoidably accompanied by difficulties in handling such a corrosive and toxic material, and by the discharge of noxious gases and fumes including hydrochloric acid, metal oxides, and chlorides. The treatment with gaseous nitrogen, even in the presence of a liquid salt cover over the molten metal, or mixed with added chlorine or chlorinated hydrocarbon, has resulted in undesirably low rates and extents of purifying action and in the excessive production of dross, with decrease of the yield of useful metal and with magnified filtration problems. Similar defects also accompanied attempts to effect the desired purification with gaseous organic chlorofluorides undiluted or at high concentrations, which at the same time involved such high added operating costs as to be impractical.

The above and similar processes have been disclosed in prior patents and publications, as follows: U.S. Pat. Nos. 2,447,672; 3,087,808; 3,149,960; Belgian Pat. No. 756,091; Yamada, "Degassing Media for Molten Aluminum," AFS Cast Metals Research Journal, pages 11–14 (March 1970), and Brant, Bone and Emley, "Fumeless In-Line Degassing and Cleaning of Liquid Aluminum" Journal of Metals, pages 48–53 (March 1971).

Accordingly, it has been the object of the present invention to provide an effective and economical process for the purification of molten aluminum and aluminum alloys which enables the substantial reduction or elimination of undesirable by-products.

A further object has been the provision of such a process whereby the gaseous product is sufficiently free of potentially harmful constituents as to require minimal or no additional treatment before discharge into the atmosphere.

A still further object has been the provision of an effective and economical process of this type, which may readily be used in available melting and casting installations.

SUMMARY OF THE INVENTION

In accordance with the present invention, it has now been found that the foregoing objects are readily and advantageously accomplished by the novel and improved process wherein a stream of gas bubbles predominantly of an inert gas, such as argon or helium, or of a relatively unreactive gas, such as nitrogen, which contains a small but essential proportion of a fully fluorinated or chlorofluorinated lower hydrocarbon, or mixture thereof, is passed through the molten aluminum or aluminum alloy in combination with a supernatant layer of a liquefied salt mixture which is of appreciably lower density than the molten metal.

In a relatively short time of treatment, 10 minutes or longer, it has been found that the content of hydrogen or other gas occluded in or absorbed in the molten aluminum or alloy is reduced to a desired low value. Maximum treatment times will depend upon the nature of the operation. In a continuous casting operation the treatment times will correspond to the length of the casting run. At the same time, foreign solid particles which were dispersed in the molten metal are removed therefrom into the liquefied salt or dross layer or so modified as to be readily removable by a subsequent screening or filtration prior to casting. Furthermore, the liquefied salt layer provides adequate protection to the molten metal from the ambient atmosphere to minimize oxidation and thus prevent the formation of excessive amount of dross, thus minimizing the loss of metal as scrap.

DETAILED DESCRIPTION

In accordance with the present invention, the rapid and effective degassing of hydrogen and the removal of foreign particles of solid from molten aluminum and its alloys are accomplished by treatment with a gaseous mixture of nitrogen or inert gas or mixtures thereof and a fully fluorinated or chlorofluorinated lower hydrocarbon or mixtures thereof while the molten metal is maintained in contact with a liquefied salt mixture having a density below that of the metal.

The preferred gas mixture is nitrogen with dichlorodifluoromethane, the latter being present to the extent of about 3 percent by volume. The liquid salt mixture is preferably a low-melting mixture of alkali metal and alkaline earth metal halides of salts selected from sodium, potassium or magnesium chloride or fluoride, the mixture having a liquidus below 1,300° and 1,400° F, which is the normal working range in aluminum melting furnace practice. Typical salt mixtures which are effective are:

A. 40–50% (by weight) KCl with 50–60% $MgCl_2$,

B. 40–50% NaCl with 45–55% KCl and 5% $Na_3AlF_6$,

C. 40–50% NaCl with 45–55% KCl and 5% $K_3AlF_6$, and

D. 40–50% NaCl with 45–55% KCl and 1% $CaF_2$.

The amount of salt mixture required varies with the melt area and with the alloy composition. Generally, it has been found desirable to use higher proportions in the treatment of aluminum alloys containing magnesium. Thus, it has been found that ⅛ to 1 pound of salt mixture should be used per square foot of melt surface for aluminum alloys substantially free from magnesium and that ⅛ to 2 pounds should be used per square foot of melt surface for the treatment of magnesium-containing alloys. The salt mixture for use in treating magnesium-containing alloys should preferably contain reduced proportions of sodium salt.

In comparative tests, the above-described degassing and cleaning treatment reduced the gas content of molten metal to below 0.12 ml of hydrogen per 100g. aluminum or alloy and effected the removal of foreign solid particles therefrom more efficiently and with less fume discharge than treatment with chlorine or other gases, even when the latter were used at higher rates of gas flow.

The effective active purifying compound is a fully fluorinated or chlorofluorinated lower hydrocarbon containing one to six C atoms, free of hydrogen, which may be open or branched chain or cyclic, and which may be saturated or unsaturated. Thus, completely fluorinated or chlorofluorinated derivatives of methane, ethane, propane, butane, pentane and hexane such as $CCl_3F$, $CCl_2F_2$, $CClF_3$, $CF_4$, $C_2Cl_5F$, $C_2Cl_4F_2$, $C_2Cl_3F_3$, $C_2Cl_2F_4$, $C_2ClF_5$, and $C_2F_6$, some in various isometric forms or mixtures, are particularly effective either alone or in mixtures containing two or more thereof. Useful unsaturated compounds are typified by the substituted ethylene derivatives $C_2FCl_3$, $C_2F_2Cl_2$, $C_2F_3Cl$, and $C_2F_4$. A mixture of two or more of the mono-, di-, and tri-fluoro chloromethanes may be especially effective and economical for use where the mixture is one resulting from the commercial synthesis without requiring the separation into the individual components.

Active fluoride or chlorofluoride concentrations of about 1% or less by volume in the treating gas are generally too slow in purifying action for most practical applications. Concentrations higher than about 10 percent by volume increase the cost of the treatment without providing sufficient compensating benefit. Such high concentrations may also tend to generate greater amounts of dross and to deposit excess carbon therein and to thicken the liquid salt mixture to an undesirable extent during the treatment. Accordingly, the active fluoride or chlorofluoride concentration will generally provide best results at concentrations of 2 to 10 percent by volume, 3 to 5 percent being the preferred range.

In view of the non-toxic and non-corrosive nature of the treating gas, considerable latitude and flexibility exists with respect to applying the purification process of this invention at convenient locations in existing melting and casting installations. Thus, the purification treatment may be effected or started in a melting furnace, in the molten metal holding chamber, the treating bays or compartments in the molten metal transfer lines, or at convenient locations in the conduits. As mentioned above, much or most of the foreign solid particles in the molten metal are transferred during the purification treatment to the supernatant dross or liquid salt layer, which are removed from the molten metal by skimming whenever this is convenient or necessary. Before casting, the molten metal is freed of residual foreign particles dispersed therein by screening or filtering. The purification treatment in accordance with this invention is readily adapted for either batchwise or continuous application.

The present invention and its main advantage will be readily understood from the following illustrative examples, and the accompanying comparative runs made in accordance with the previously described prior art procedures.

EXAMPLE A

In this example, comparative runs in accordance with prior art procedures were carried out in a gas-fired open-hearth furnace in which 4,500 pounds of 5 A grade aluminum were melted and maintained at a temperature of $1,330°$ F. $\pm 15°$. Each of four charges was treated with one of the following:

(a) chlorine, (b) nitrogen, (c) nitrogen containing 5 percent by volume $CCl_2F_2$, and (d) nitrogen containing 10 percent by volume $CCl_2F_2$. Treating gas was bubbled through the molten metal by means of four graphite tubes of 0.5 inch I.D. at a total flow rate maintained at 3.2 cfm (cubic feet at atmospheric pressure and $70°$ F. per minute) for 25 to 40 minutes.

The hydrogen content of the molten metal was monitored by means of an FMA instrument, as described in the publication by M. Heckler in Aluminum, Vol. 43, page 239 (1967). Stack effluent measurements were made using an "RAC Model 2343 Train Staksamplr," as described by W. S. Smith and others in the publication "Stack Gas Sampling Improved and Simplified with New Equipment," Air Pollution Control Association, Paper No. 67-119, June 11-16, 1967, (Cleveland, Ohio). The melt cleanliness was evaluated by filtering the molten metal and examining the residue retained by the filter. Following treatment, the dross was removed by skimming and was weighed.

The data obtained are summarized in the following:

| Time - mins. | 1. Hydrogen removal from melt Vol. of $H_2$ per 100g. Al - c.c. | | | |
|---|---|---|---|---|
| | (a) $Cl_2$ | (b) $N_2$ | (c) $N_2$+5% $CCl_2F_2$ | (d) $N_2$+10% $CCl_2F_2$ |
| 0 | 0.40 | 0.40 | 0.40 | 0.40 |
| 5 | .29 | .36 | .31 | .28 |
| 10 | .22 | .32 | .24 | .19 |
| 15 | .17 | .28 | .19 | .15 |
| 20 | .14 | .26 | .16 | .12 |
| 25 | .12 | .23 | .13 | .10 |
| 30 | .10 | .21 | .11 | — |
| 35 | — | .19 | .10 | — |
| 40 | — | .17 | — | — |
| 2. Melt cleanliness | | | | |
| | Good | Unsatisfactory | Unsatisfactory | Unsatisfactory |
| 3. Stack Emission rates - pounds per hour | | | | |
| As $Al_2O_3$ | 21.6 | Slight | Slight | 3.2 |
| As HCl | 42.3 | Slight | Slight | 4.7 |
| 4. Dross - pounds | | | | |
| | 45 | 40 | 75 | 150 |

Thus, each of the treatments in accordance with the prior art was defective in at least one of the essential criteria: in (a), the stack emission was excessive; in (b), hydrogen was not adequately removed even after 40 minutes treatment; and the melt cleanliness was unsatisfactory; in (c) and (d), the melt cleanliness was inadequate and the loss of metal in the dross was unduly high.

EXAMPLE 1

A treatment in accordance with the invention was carried out as described above with respect to Example A, but with the treating gas consisting of nitrogen containing 3 percent by vol. $CCl_2F_2$ and in the presence of a supernatant layer of a molten mixture of alkali and/or alkaline earth halides characterized by a melting point below 1,300° F. over the surface of the molten metal, in a proportion of 0.4 to 0.7 pound per square foot of melt surface. A typical suitable salt mixture used contained 57% NaCl, 11% KCl, and 32% $MgCl_2$.

The treatment in a period of 35 minutes yielded results which surpassed the requirements in all respects. The hydrogen content of the metal had been reduced to 0.10 c.c. per 100 grams; the melt cleanliness was good to excellent; the dross weight was in the range of 40 to 50 pounds; and the stack emissions were slight, corresponding to less than 1 to 2 pounds $Al_2O_3$ and less than 2 to 5 pounds of HCl per hour.

EXAMPLE B

Comparative plant scale runs were made, using a 30 ton capacity gas-fired open-hearth melting furnace, from which molten metal was transferred to a 20 ton gas-fired holding furnace. Gas treatments were carried out batch-wise for ten minutes in the melting furnace and for 30 minutes in the holding furnace, the gas being introduced into the molten metal through iron tubes, movable through the melt. The molten metal was continuously treated with the gas or gas mixture during transfer from the holding furnace to the casting station, being introduced into the flowing metal by means of ten spaced graphite tubes of 0.5 inch I.D. Hydrogen determinations were made, as described above, at suitable intervals during the casting operation. Dross was removed by skimming from the holding furnace and transfer conduit after the gas treatment and was weighed and assayed to determine the metal losses in terms of the percentage of the weight of cast ingot. The determinations of stack emissions were carried out as described above.

Four comparative runs were carried out as follows:

|  | (a) | (b) | (c) | (d) |
| --- | --- | --- | --- | --- |
| Alloy | 1145 | 1145 | 3004(con'tg.Mg) | 3004(con'tg.Mg) |
| Treating gas | $Cl_2$ | $N_2$-5% $CCl_2F_2$ | $Cl_2$ | $N_2$-5% $CCl_2F_2$ |
| Treating gas rate (cfm): |  |  |  |  |
| Melting furnace | 4.1 | 2.4 | 5.0 | 2.4 |
| Holding furnace | 5.0 | 3.4 | 2.9 | 1.7 |
| Conduit | 4.5 | 3.2 | 5.0 | 3.2 |

The data which were obtained are summarized in the following:

|  | (a) | (b) | (c) | (d) |
| --- | --- | --- | --- | --- |
| Average $H_2$ content - cc per 100g. Al | 0.08 | 0.08 | 0.09 | 0.07 |
| Melt cleanliness | Good | Unsatisfactory | Good | Unsatisfactory |
| Metal loss | 0.3% | 1.5% | 0.7% | 0.6% |
| Stack Emissions |  |  |  |  |
| lbs per hr. $Al_2O_3$ | 16.5 | 2 | 1.4 | 0.02 |
| lbs per hr. HCl | 42 | 5.5 | 54.5 | 2 |

It is thus apparent that the chlorine treatment is deficient mainly with respect to the excessive stack emissions and that the nitrogen and $CCl_2F_2$ treatment performs inadequately with respect to melt cleanliness.

EXAMPLE 2

Comparative plant scale runs in accordance with this invention were carried out as described in the above Example B, but with the treating gas of nitrogen containing 3 percent by volume of $CCl_2F_2$ and in the presence of a supernatant layer of a molten mixture of alkali and/or alkaline earth halides having a melting point below 1,300° F. over the surface of the molten metal, in proportions and having a composition as above specified. Run (a) was made on Alloy 1145 and run (b) on Alloy 5050 (containing Mg), using treating gas rates and amounts of molten salt, as follows:

|  | Gas rate | Salt | Gas rate | Salt |
| --- | --- | --- | --- | --- |
| Melting Furnace | 3 cfm | — | 2.5 cfm | — |
| Holding Furnace | 3 cfm | 25 lbs | 2.5 cfm | 40 lbs |
| Conduit | 2.5 cfm | 25 lbs | 2.0 cfm | 40 lbs |

The data obtained in these runs made in accordance with the invention are summarized in the following:

|  | (a) | (b) |
| --- | --- | --- |
| Average $H_2$ content -cc per 100g. Al | 0.08 | 0.08 |
| Melt cleanliness | Good | Good |
| Stack Emissions | Slight | Slight |
| lbs per hr. $Al_2O_3$ | 2 | 1 |
| lbs per hr. HCl | 5 | 2 |
| Metal loss | 0.6% | 0.6% |

The above results, obtained in plant scale operations in direct comparison with the best prior art treatments, substantiate the significant advantages of the process in accordance with this invention in the substantial elimination or alleviation of the stack emission problem while effecting the efficient degassing and cleaning of the molten metal, at a low loss of metal. Other important benefits are attained, at the same time, through operating in accordance with the invention, in view of the ease and convenience of handling a non-toxic and non-corrosive treating gas. The need for many precautions required to be observed in the handling of chlorine is thereby entirely eliminated.

When the fluorinated or chlorofluorinated component of the treating gas is liquid at the usual working temperatures, the dilute gas mixture with the inert or inactive component may readily be prepared by bubbling the latter gas through the liquid, while the latter is maintained at the proper temperature to produce the desired dilute treating composition.

The invention may be embodied in forms varying in specific details and procedures from the foregoing examples and description without departing from the spirit or essential characteristics thereof. The preferred embodiments herein are therefore to be considered illustrative, and all changes which are within the meaning and range of equivalency are to be deemed within the scope of the invention, as defined and indicated by the appended claims.

What is claimed is:

1. A process for purifying aluminum base alloys by removing gaseous and solid particulate impurities therefrom which comprises: providing a molten aluminum base alloy containing gaseous and solid particulate impurities therein; providing over said molten alloy a supernatant layer of a molten mixture of at least two halide salts, wherein the cation is selected from the group consisting of an alkali metal and an alkaline earth metal, bubbling a treating gas through said molten alloy, said gas consisting essentially of an inert carrier gas and an effective amount of a fully halogenated lower hydrocarbon containing one to six carbon atoms, which is free of hydrogen and contains at least one fluorine atom, said gas containing up to 10 percent by volume of said hydrocarbon, thereby transferring solid particulate impurities to the supernatant layer and removing gaseous impurities therefrom; and separating the said alloy in purified condition.

2. A process in accordance with claim 1 wherein the said halohydrocarbon is fully fluorinated.

3. A process in accordance with claim 1 wherein the said halohydrocarbon is a mixture of at least two such compounds.

4. A process in accordance with claim 1 wherein the said halohydrocarbon constitutes 2 to 10 percent by volume of the said gas.

5. A process in accordance with claim 1 wherein the said halohydrocarbon comprises a fully chlorofluorinated hydrocarbon.

6. A process in accordance with claim 1 wherein the said halohydrocarbon comprises $CCl_2F_2$.

7. A process in accordance with claim 1 wherein the said halohydrocarbon comprises 3 to 5 percent by volume $CCl_2F_2$.

8. A process in accordance with claim 1 wherein the said inert gas is selected from the group consisting of nitrogen, helium and argon.

9. A process in accordance with claim 1 wherein the said treating gas is nitrogen containing about 3 percent by volume $CCl_2F_2$.

10. A process in accordance with claim 1 wherein the said halohydrocarbon is a mixture of $CCl_3F$, $CCl_2F_2$, and $CClF_3$.

11. A process in accordance with claim 1 wherein the said halohydrocarbon includes a haloethylene selected from the group consisting of $CF_2 = CF_2$, and $CCl_2 = CFCl$.

12. A process in accordance with claim 1 wherein the said halohydrocarbon includes a haloethane selected from the group consisting of $CCl_3 \cdot CCl_2F$, $CCl_2F \cdot CCl_2F$, $CClF_2 \cdot CClF_2$, $CF_3 \cdot CCl_2F$, $CCl_3 \cdot CF_3$, $CCl_2F \cdot CF_3$, $CClF_2 \cdot CF_3$, and $CF_3 \cdot CF_3$.

13. A process in accordance with claim 1 wherein the said molten salt mixture has a melting point below 1,400° F.

14. A process in accordance with claim 1 wherein the said molten salt mixture includes a halide or an alkali metal and of an alkaline earth metal.

15. A process in accordance with claim 1 wherein the said molten salt includes about 40 – 50 percent each of an alkali chloride and of an alkaline earth chloride and up to 5 percent of a fluoride.

16. A process in accordance with claim 1 wherein the said halohydrocarbon contains one to two carbon atoms and one to four fluorine atoms.

17. A process in accordance with claim 1 wherein said treating gas is nitrogen containing up to 10 percent by volume of said halohydrocarbon.

18. A process in accordance with claim 1 wherein the said treating as is nitrogen containing 3 to 5 percent by volume of said halohydrocarbon.

19. A process in accordance with claim 1 wherein the said gas is bubbled through the said molten alloy for at least 10 minutes.

20. A process in accordance with claim 1 wherein the said gas is bubbled through the said molten alloy for about 30 minutes.

21. A process in accordance with claim 1 wherein the said supernatant layer is present in a proportion of ⅛ to 2 pounds of salt mixture per square foot of surface of said molten aluminum alloy.

22. A process in accordance with claim 1 wherein the said supernatant layer is present in a proportion of about one pound per square foot of surface of the said molten aluminum alloy.

* * * * *